United States Patent [19]

Malandra et al.

[11] Patent Number: 5,225,150
[45] Date of Patent: Jul. 6, 1993

[54] INTEGRATED HEAD PACKAGE FOR TOP MOUNTED NUCLEAR INSTRUMENTATION

[75] Inventors: Louis J. Malandra, McKeesport; Leonard P. Hornak, Forest Hills; Robert E. Meuschke, Monroeville, all of Pa.

[73] Assignee: Westinghouse Electric Corp., Pittsburgh, Pa.

[21] Appl. No.: 903,250

[22] Filed: Jun. 23, 1992

[51] Int. Cl.$^5$ .................. G21C 19/00; G21C 11/00
[52] U.S. Cl. .................................. 376/263; 376/287
[58] Field of Search ............... 376/263, 262, 287, 260, 376/294, 254, 463

[56] References Cited

U.S. PATENT DOCUMENTS

| | | | |
|---|---|---|---|
| 3,827,935 | 8/1974 | Grüner et al. | 376/245 |
| 3,853,702 | 12/1974 | Bevilacqua et al. | 376/245 |
| 3,899,390 | 8/1975 | Klein et al. | 376/245 |
| 4,438,649 | 3/1984 | Gilman | 376/245 |
| 4,765,947 | 8/1988 | Babin et al. | 376/245 |
| 4,828,789 | 5/1989 | Hankinson et al. | 376/263 |
| 4,830,814 | 5/1989 | Altman | 376/287 |
| 4,983,351 | 1/1991 | Tower et al. | 376/254 |
| 5,078,957 | 1/1992 | Tower et al. | 376/254 |

*Primary Examiner*—Daniel D. Wasil
*Attorney, Agent, or Firm*—J. C. Valentine

[57] ABSTRACT

A nuclear reactor such as a pressurized water reactor has an integrated head package providing structural support and increasing shielding leading toward the vessel head. A reactor vessel head engages the reactor vessel, and a control rod guide mechanism over the vessel head raises and lowers control rods in certain of the thimble tubes, traversing penetrations in the reactor vessel head, and being coupled to the control rods. An instrumentation tube structure includes instrumentation tubes with sensors movable into certain thimble tubes disposed in the fuel assemblies. Couplings for the sensors also traverse penetrations in the reactor vessel head. A shroud is attached over the reactor vessel head and encloses the control rod guide mechanism and at least a portion of the instrumentation tubes when retracted. The shroud forms a structural element of sufficient strength to support the vessel head, the control rod guide mechanism and the instrumentation tube structure, and includes radiation shielding material for limiting passage of radiation from retracted instrumentation tubes. The shroud is thicker at the bottom adjacent the vessel head, where the more irradiated lower ends of retracted sensors reside. The vessel head, shroud and contents thus can be removed from the reactor as a unit and rested safely and securely on a support.

10 Claims, 3 Drawing Sheets

INTEGRATED HEAD PACKAGE FOR TOP MOUNTED NUCLEAR INSTRUMENTATION

GOVERNMENT CONTRACT

The Government of the United States of America has rights in this invention pursuant to Contract No. DE-AC03-90SF18495 awarded by the Department of Energy.

BACKGROUND OF THE INVENTION

1. Field of the Invention

This invention relates to the field of instrumentation for nuclear reactor vessels such as pressurized water reactors. In particular, the invention provides an integrated head structure having a shroud which encloses retractable instrumentation above the reactor vessel head or cover. The head structure provides a structural support for use when the head is removed as a unit from the reactor vessel, with integral shielding for elements which have been exposed to radiation. The head structure also provides a means for protecting the rod position indicators and control rod drive mechanisms from the heat of the reactor vessel, by providing a cooling air path.

2. Prior Art

In a nuclear reactor such as a pressurized water reactor, a sealed reactor vessel houses a number of fuel rods in assemblies fixed in a vertical orientation between upper and lower core plates in the reactor vessel. Mechanisms are provided above the head of the reactor vessel for lowering control rods into spaces between the fuel rods by a required axial distance, for controlling the level of nuclear flux by absorbing a portion of the neutrons and gamma rays emitted by the fission process. Additionally, a plurality of instrumentation tubes are provided at spaces between the fuel rods in the fuel assemblies for sensing the conditions in the core, such as neutron or gamma flux levels, exit coolant temperature and the like. The control rod positioning apparatus and the instrumentation tubes for the sensors (or their connecting cables) extend through pressure penetrations in the head of the reactor vessel. When the reactor is to be serviced, the control rods are lowered into the assemblies which carry the fuel rods, and the instrumentation tubes are retracted from the fuel assemblies. The head of the reactor vessel is unbolted and lifted away using a polar crane provided in the containment structure for the reactor vessel, and the head with its depending structures is placed on a support structure or pedestal above a pool of water. The lowermost portions of the instrumentation tubes are the most heavily irradiated, and remain below the reactor head in the pool, or may be cut away and replaced.

A reactor design having instrumentation tubes extending through the head of the reactor vessel is preferred over a design having the instrumentation entering the core from below. There are a number of known variations, including for example instrumentation tubes which are guided through a top entry around a curve to engage the fuel assemblies from below. Top entry avoids forming openings or seals in the bottom of the reactor vessel, and is safer in the event of an accident. The top entry design, however, results in a rather complex structure because the instrumentation tubes must interface with a plurality of control rod positioning devices and instrumentation tube connections over the head of the reactor vessel. It also may be necessary to protect these devices and connections from the heat of the reactor vessel to ensure proper operation.

The instrumentation tubes and/or the electrical connections for the tubes are guided from one or more sealed entries through the head of the reactor vessel to instrumentation thimble tubes in a plurality of fuel assemblies in the core, by guides which are disposed below the head and form parts of the internal reactor structure. are shown in U.S. patents U.S. Pat. No. 3,827,935—Grüner et al; U.S. Pat. No. 3,853,702—Bevilacqua et al; U.S. Pat. No. 4,765,947—Babin et al; and U.S. Pat. No. 4,983,351—Tower et al. Normally, at least one sensor tube is provided for each fuel assembly in the reactor core.

In the Westinghouse AP600 design which is the subject of the invention, a supply of cooling air is provided to the portions of the control rod drive mechanisms and instrumentation in the area above the head of the reactor vessel. The control rod drive mechanisms in reactors can be shrouded so as to confine cooling air to the area needing cooling. In known arrangements, the shroud is a lightweight enclosure. When the top of the reactor is removed and stored, thus exposing the irradiated lower portions of the instrumentation tubes, it is often necessary to erect temporary shielding around the head structure, and in particular the depending instrumentation tubes, to avoid exposing workers to undue levels of radiation.

The cooling air shroud for the control rod drive mechanism in the AP600 design extends from the reactor vessel head to a seismic support plate. The cooling air shroud enables the control rod drive assembly to be raised from the reactor vessel together with the head of the reactor vessel. The support apparatus generally, and the seismic support in particular, ensure that the control rod drive mechanism remains vertically over the fuel assemblies such that the control rods are freely movable into the fuel assemblies to damp nuclear flux, and if necessary, to shut down the reactor in case of seismic disturbance or even missile attack.

SUMMARY OF THE INVENTION

It is an object of the invention to provide an integral shroud and radiation shield of sufficient strength and durability to enable the reactor head and the internal structures associated with the head to be handled safely as a self supporting structural unit.

It is also an object of the invention to provide a shroud structure which is provided with shielding of increasing thickness proceeding downwardly, thereby providing the greatest extent of shielding at the most highly irradiated lower portions.

It is a further object of the invention to simplify and facilitate reactor maintenance steps, by allowing the reactor head to be safely handled.

It is another object of the invention to provide a self supporting integral head structure which eliminates the need for lift legs and seismic support tie rods, but does not interfere with the scarce space available for control rod guides and instrumentation tubes in the area over the reactor head.

These and other objects are accomplished in a nuclear reactor such as a pressurized water reactor with a reactor vessel containing nuclear fuel interspersed with thimble tubes. The reactor has an integrated head package providing structural support, increasing shielding leading toward the head, and forming a temperature limited enclosure. A reactor head engages the reactor vessel. A control rod guide mechanism disposed over the head raises and lowers control rods in certain of the thimble tubes, traversing penetrations in the reactor head, and being coupled to the control rods. An instrumentation tube structure controls instrumentation tubes having sensors movable into certain of the thimble tubes for monitoring local conditions in the reactor fuel assemblies. A coupling for the sensors extends upwardly, also traversing the reactor head such that the sensors can be retracted. A shroud is attached over the reactor head and encloses the control rod guide mechanism and at least a portion of the instrumentation tubes when retracted. The shroud forms a structural element of sufficient strength to support the head, the control rod guide mechanism and the instrumentation tube structure, and includes radiation shielding material for limiting passage of radiation from retracted instrumentation tubes. More particularly, the shroud is thicker at the bottom adjacent the head, where the more irradiated lower ends of retracted sensors reside. The head, shroud and contents thus can be removed from the reactor as a unit and rested safely and securely on a horizontal surface.

BRIEF DESCRIPTION OF THE DRAWINGS

There are shown in the drawings the embodiments of the invention as presently preferred. It should be understood, however, that the invention is not limited to the preferred embodiments shown, which are exemplary rather than limiting. In the drawings.

DETAILED DESCRIPTION OF THE PREFERRED EMBODIMENTS

Figure 1:
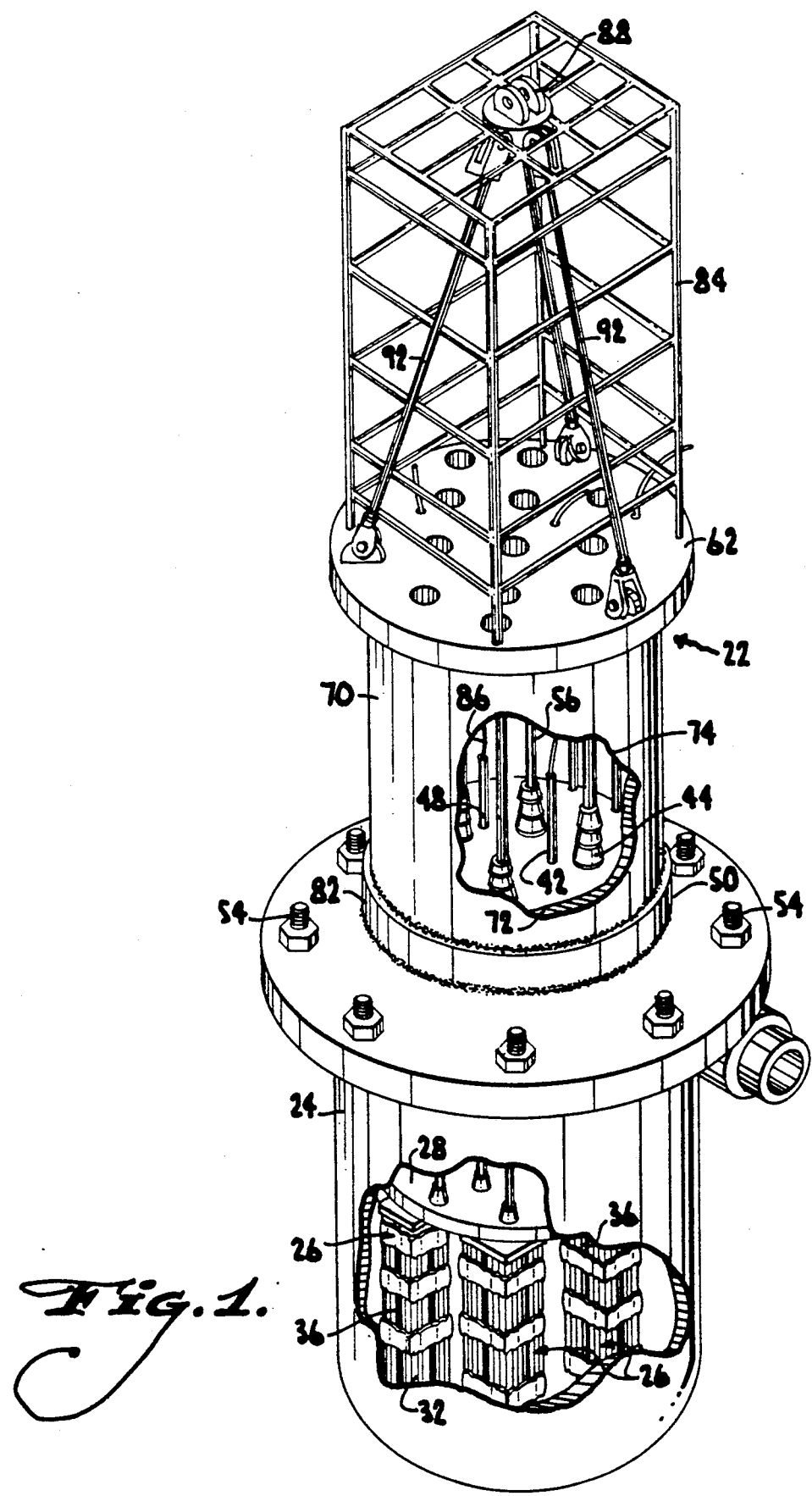
FIG. 1 is a perspective illustration of a nuclear reactor with an integrated head package for top mounted nuclear instrumentation, according to the invention.
Figure 2:
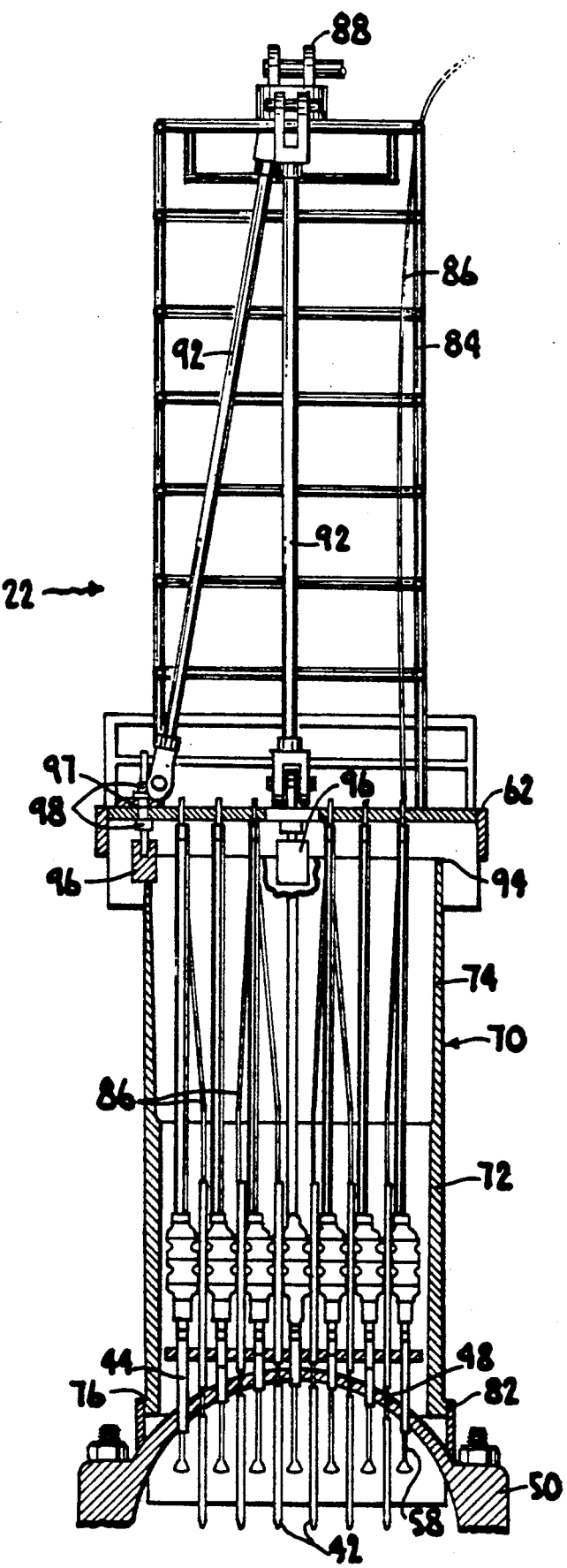
FIG. 2 is a partial section view showing the head package, taken along lines 2—2 in FIG. 1.

Referring to the perspective drawing of FIG. 1 and the cross section of FIG. 2, an integrated head package 22 is provided for a nuclear reactor. The reactor includes a reactor vessel 24 containing nuclear fuel rods carried in a plurality of fuel assemblies 26 between an upper core plate 28 and a lower core plate 32. Each of the fuel assemblies 26 has certain thimble tubes occupying gaps in the pattern of fuel rods, aligned to guide tubes which extend between an upper support plate 34 (shown in FIG. 3) and the upper core plate 28. Control rods 36 as well as instrumentation tubes 42 are movably mounted to be extendable though penetrations 44, 48 in the reactor vessel head 50.

The reactor vessel head 50 is a substantial structure, and must withstand pressures in the reactor vessel 24 on the order of 150 bars or about 2,200 psi. The head 50 is sealingly clamped to the reactor vessel 24 by bolts 54. The penetrations 44 for the control rod positioning mechanisms 56 and the penetrations 48 for the instrumentation tubes 42 are capable of withstanding such pressures. Examples of appropriate penetration or seal structures are disclosed, for example, in U.S. patent U.S. Pat. No. 4,983,351—Tower et al; U.S. Pat. No. 3,853,702—Bevilacqua et al, etc.

The mechanism 56 for raising and lowering the control rods 36 relative to the fuel assemblies 26 includes control rod positioning shafts 58, which pass through the penetrations 44 in the reactor vessel head 50. A control rod drive coupled to the control rod positioning shafts 58 is disposed above the reactor vessel head 50, but is not shown in order to simply the drawing.

The instrumentation tube structures 42 contain sensor arrangements such as a plurality of axially spaced sensors responsive to neutron and gamma radiation, and preferably at least one temperature sensor. The instrumentation tubes 42 can be lowered into certain of the thimble tubes in the fuel assemblies 26 which are not occupied by control rods 36, for placing the sensors in proximity with the fuel rods as well as the coolant in the reactor vessel 24. Electrical couplings for the sensor arrangements extend upwardly through the reactor vessel head 50, the instrumentation tubes 42 and/or their electrical connections likewise passing through penetrations 48 in the reactor vessel head 50 such that the sensor arrangement is retractable relative to the fuel assemblies 26.

In the area above the reactor vessel head 50, a seismic support plate 62 is arranged at a space from the reactor vessel head. The seismic support plate 62 provides means for restraining the top of the control rod drive mechanism pressure housing. The seismic support plate 62 must remain precisely positioned relative to the fuel assemblies 26 in the reactor core, so that the control rod positioning shafts 58 always align with their respective thimbles, permitting correct positioning of the control rods 36 even in the event of a seismic disturbance. This preserves the possibility that the reactor can be "scrammed" by fully inserting the control rods 36 into the fuel assemblies 26 to provide maximum damping of nuclear flux. Normally, it would be necessary to couple the seismic support plate 62 to the vessel head 50 by a number of lift rods; however, according to the invention the seismic support plate 62 and the reactor vessel head 50 are coupled by a structurally sound shroud 70, which also provides shielding advantages and provides a means for cooling the mechanisms disposed over the vessel head 50.

The shroud 70 is attached to the reactor vessel head 50 and substantially encloses the control rod guide mechanism 56 and at least a portion of the instrumentation tube structures when retracted. The shroud 70 and the reactor vessel head 50 to which the shroud 70 is attached form a structural element of sufficient strength to support the vessel head 50, the control rod guide mechanism 56 and the instrumentation tube structure 42. This arrangement enables the whole integrated head package 22 to be removed from the reactor as a unit for servicing the contents of the reactor vessel 24.

At its bottom 72, adjacent the reactor vessel head 50, the shroud 70 is substantially thicker than at its top 74. For example, the shroud 70 can be on the order of five inches (13 cm) thick at the bottom 72, and three inches (8 cm) thick at the top 74. The shroud 70 is shaped as a cylindrical tube, and is attached by welding or bolts to the reactor vessel head 50. The bottom edge of the shroud can be reinforced or provided with a structure which assists in effecting the structural attachment of the shroud and the vessel head. As shown in FIGS. 1 and 2, the bottom edge of the shroud can have a flange 76 providing an attachment to the vessel head 50, preferably including a collar member 82 which is welded to the vessel head 50 and to the flange 76 on the shroud 70, respectively.

Figure 3:
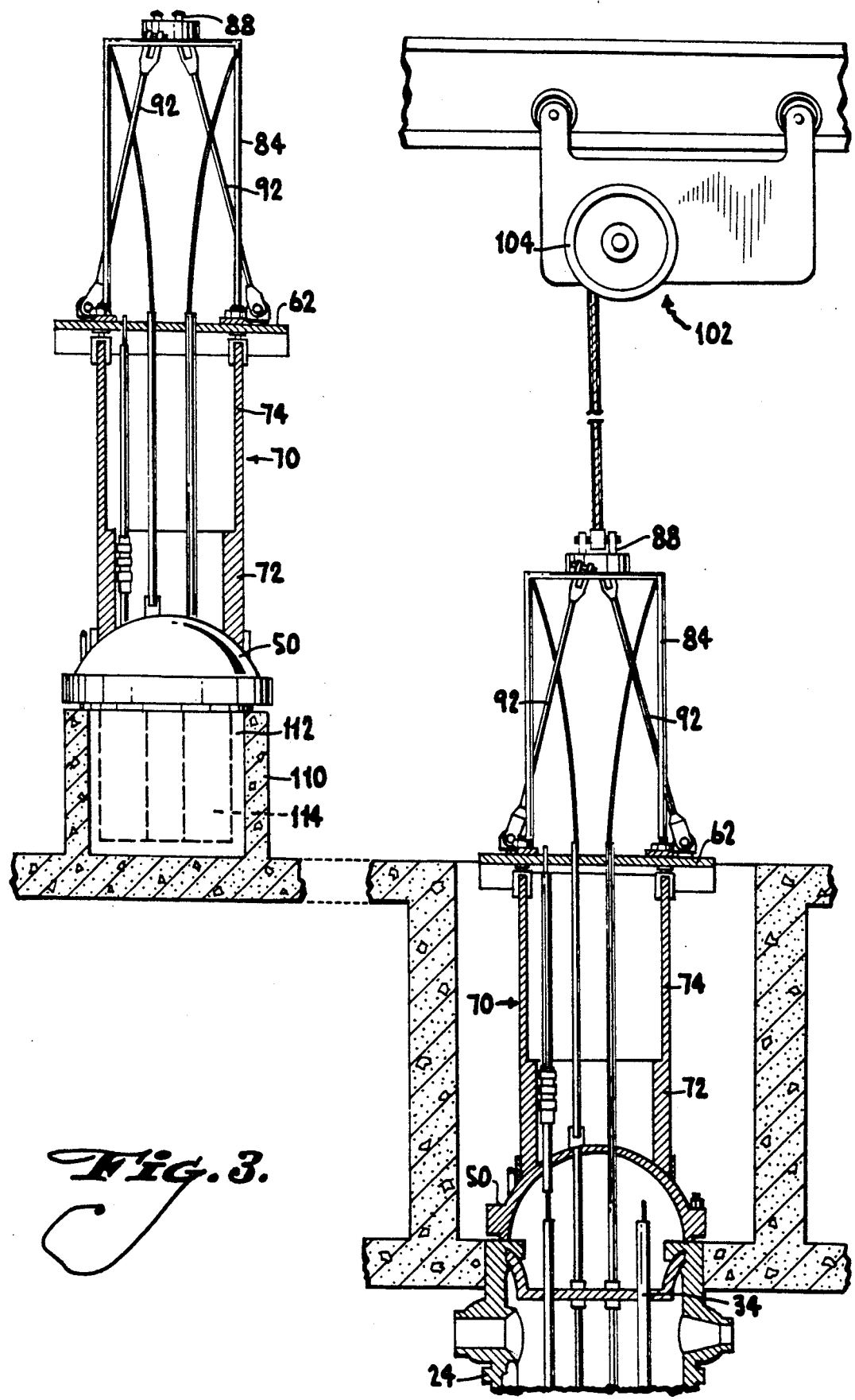
FIG. 3 is a schematic sectional view showing removal and storage of the integral head package from a pressurized water reactor according to the invention.

When it is necessary to remove the reactor head 50 for servicing the reactor contents, the control rods 36 are lowered and the instrumentation tubes 42 are retracted upwardly from the fuel assemblies. The lowermost portions of these structures are the most heavily irradiated because they are placed in close proximity to the fuel rods when the reactor is operational. The reactor vessel 24 is depressurized, and the reactor head 50 is unbolted from its attachment to the vessel. As shown in FIG. 3, a lifting apparatus such as the polar crane normally provided in the reactor containment building is then engaged with the integrated head structure 22, and the entire head structure is lifted away. A pedestal-like support over a pool of water can be provided to support the vessel head, the control rod drive mechanisms and the instrumentation tube structures. The thickest and therefore most effective shielding portions of the shroud protect against escape of radiation from the lowermost, most heavily irradiated portions.

Preferably, the head structure includes a lifting rig 92 disposed over the seismic support plate 62, and attached thereto, with the withdrawn instrumentation tube connecting lines 86 passing along the spreader frame 84. At the top of the lifting rig 92, a clevis 88 or similar fitting is provided for coupling to the polar crane, e.g., using a connecting pin. The spreader frame, however, does not support the weight of the integrated head structure 22. For this purpose, a plurality of lift rods 92 couple between the crane clevis 88 and the seismic support plate 62. For example, three lift rods at 120° spacing can be provided between the crane clevis 88 and the seismic support plate 62. The seismic support plate 62 is rigidly fixed to the top edge 94 of the shroud 70, and accordingly the force exerted by the polar crane or other lifting apparatus is applied at the seismic support plate 62 and top shroud edge 94 to lift the head structure 22 away from the reactor vessel 24.

In the embodiment shown, the top edge 94 of the shroud 70 is thickened via buttress fittings 96 for each of the lift rods 92. The buttress fittings 96 comprise a downwardly opening channel enclosing over the inside and outside of the shroud 70 at the top 94. The uppermost portion of the buttress fittings is bored and threaded for receipt of a connecting bolt 97 that protrudes through the seismic support plate 62. Nuts 98 provided on the connecting bolt over and under the seismic support plate 62 allow accurate positioning of the seismic support plate 62 as well as a means for rigidly fixing the seismic support plate 62 to the shroud 70. The buttress fittings 96 can be welded to the shroud 70.

The shroud 70 is made of steel or similar material which attenuates radiation. Although the shroud 70 in the embodiment shown has two stepwise variations in thickness, it would also be possible to provide additional steps, or a continuous decrease in thickness from the lower portion adjacent the vessel head 50 proceeding upwardly, whereby lower portions of the instrumentation tubes 42 and the like are preferentially shielded by the shroud.

FIG. 3 shows the integrated head package 22 of the invention as engaged using the overhead crane or similar lifting apparatus 102, for example having a travelling winch 104. The lifting apparatus 102 is coupled to the clevis fitting 88 at the top of the head package 22. The reactor head 50 is unbolted from the reactor vessel and the entire head package 22 can be lifted away from the reactor, for example to be placed on support 110 therefor. The connection between the lifting apparatus is structurally secure due to the rigid connection defined by the clevis fitting 88, lift rods 92, seismic support plate 62, shroud 70 and reactor head 50. Insofar as the lower more irradiated portions of the instrumentation tubes 42 can be retracted to where they reside above the reactor head 50, the thicker lower section 72 of the shroud 70 shields against escape of radiation. This arrangement can be supplemented using a support structure as shown, having an internal shielded area 112 for the extreme lowermost portions 114 of the instrumentation tubes, which may still extend below the reactor head.

The invention having been disclosed in connection with preferred embodiments, a number of variations according to the invention will now become apparent to persons skilled in the art. Whereas the invention is intended to cover a reasonable range of variations in addition to the preferred embodiments discussed in detail, reference should be made to the appended claims rather than the foregoing specification, in order to assess the scope of the invention in which exclusive rights are claimed.

We claim:

1. An integrated head package for a nuclear reactor having a reactor vessel containing a nuclear fuel, comprising:

a reactor vessel head including means for sealingly engaging the reactor vessel;

a control rod guide mechanism operable to raise and lower control rods relative to the fuel, the control rod guide mechanism including control rod positioning means movably traversing penetrations in the reactor vessel head, and a control rod drive coupled to the control rod positioning means;

at least one instrumentation tube structure including a sensor arrangement disposed in proximity with the fuel, and a coupling for the sensor arrangement extending upwardly, the instrumentation tube structure traversing a penetration in the reactor vessel head and the sensor arrangement being retractable relative to the fuel; and, a shroud attached to the reactor vessel head and substantially enclosing the control rod guide mechanism and at least a portion of the instrumentation tube structure when retracted, the shroud comprising a shielding material of a sufficient thickness to limit passage of nuclear radiation and forming a structural element of sufficient strength to support the vessel head, the control rod guide mechanism and the instrumentation tube structure;

whereby the integrated head package is removable from the reactor as a unit for servicing.

2. An integrated head package for a nuclear reactor having a reactor vessel containing a nuclear fuel, comprising:

a reactor vessel head including means for sealingly engaging the reactor vessel;

a control rod guide mechanism operable to raise and lower control rods relative to the fuel, the control rod guide mechanism including control rod positioning means movably traversing penetrations in the reactor vessel head, and a control rod drive coupled to the control rod positioning means;

at least one instrumentation tube structure including a sensor arrangement disposed in proximity with the fuel, and a coupling for the sensor arrangement extending upwardly, the instrumentation tube structure traversing a penetration in the reactor vessel head and the sensor arrangement being retractable relative to the fuel; and, a shroud attached to the reactor vessel head and substantially enclosing the control rod guide mechanism and at least a portion of the instrumentation tube structure when retracted, the shroud comprising a shielding material for limiting passage of nuclear radiation and forming structural element of sufficient strength to support the vessel head, the control rod guide mechanism and the instrumentation tube structure, said shielding material being relatively thicker at a lower portion adjacent the vessel head and relatively thinner proceeding upwardly from the vessel head, whereby lower portions of the instrumentation tube structure are preferentially shielded by the shroud.

3. The integrated head package according to claim 1, further comprising at least one fitting coupled to the shroud for receiving a lifting apparatus.

4. The integrated head package according to claim 3, further comprising a seismic support plate attached at a top of the shroud and operable to position the control rod guide mechanism, and wherein the at least one fitting is coupled to the shroud by a plurality of lift rods.

5. The integrated head package according to claim 4, further comprising a spreader frame disposed over the shroud, the spreader frame supporting couplings for the instrumentation tube structures, and wherein the lift rods extend coextensively along the spreader frame.

6. A nuclear reactor, comprising
a reactor vessel containing a plurality of nuclear fuel assemblies having laterally spaced vertical fuel rods and interspersed thimble tubes;
a reactor vessel head including means for sealingly engaging the reactor vessel;
a control rod guide mechanism operable to raise and lower control rods in certain of the thimble tubes, the control rod guide mechanism including control rod positioning means movably traversing penetrations in the reactor vessel head, and a control rod drive coupled to the control rod positioning means;
at least one instrumentation tube structure having a plurality of instrumentation tubes movable into certain others of said thimble tubes, and a coupling for a sensor arrangement in the instrumentation tubes extending upwardly, the instrumentation tube structure traversing a penetration in the reactor vessel head and the sensor arrangement being retractable relative to the fuel assemblies;
a shroud attached to the reactor vessel head and substantially enclosing the control rod guide mechanism and at least a portion of the instrumentation tube structure when retracted, the shroud forming a structural element of sufficient strength to support the vessel head, the control rod guide mechanism and the instrumentation tube structure, the shroud including a nuclear radiation shielding material of sufficient thickness to limit passage of radiation from the instrumentation tube structure when retracted.

7. The nuclear reactor according to claim 6, wherein the shielding material is relatively thicker at a lower portion adjacent the vessel head and relatively thinner proceeding upwardly from the vessel head, whereby lower portions of the instrumentation tube structure are preferentially shielded by the shroud.

8. The nuclear reactor according to claim 6, further comprising at least one fitting coupled to the shroud for receiving a lifting apparatus.

9. The nuclear reactor according to claim 7, further comprising a seismic support plate attached at a top of the shroud and operable to position the control rod guide mechanism, and wherein at least one fitting is coupled to the shroud by a plurality of lift rods.

10. The nuclear reactor according to claim 9, further comprising a spreader frame disposed over the shroud, the spreader frame supporting couplings for the instrumentation tube structures, and wherein the lift rods extend coextensively along the spreader frame.

* * * * *